United States Patent
Nakatani

(10) Patent No.: US 8,021,041 B2
(45) Date of Patent: Sep. 20, 2011

(54) IMAGE FORMING APPARATUS

(75) Inventor: Takanobu Nakatani, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 422 days.

(21) Appl. No.: 12/366,766

(22) Filed: Feb. 6, 2009

(65) Prior Publication Data

US 2009/0207881 A1  Aug. 20, 2009

(30) Foreign Application Priority Data

Feb. 15, 2008 (JP) .................................. 2008-034090

(51) Int. Cl.
*G01K 11/00* (2006.01)
*G03G 21/20* (2006.01)

(52) U.S. Cl. ................ 374/162; 374/E11.018; 374/121; 399/92

(58) Field of Classification Search .................. 374/121, 374/124, 129, 130, 161, 162, E11.018; 399/92, 399/94, 44; 702/130

See application file for complete search history.

(56) References Cited

U.S. PATENT DOCUMENTS

| 5,164,778 A * | 11/1992 | Tanabe et al. ........................ 399/9 |
| 5,772,328 A * | 6/1998 | Kronberg ........................ 374/162 |
| 7,228,204 B2 * | 6/2007 | Iino et al. ........................ 700/300 |
| 2006/0117205 A1 * | 6/2006 | Sawada ........................ 713/500 |

FOREIGN PATENT DOCUMENTS

JP  02-050189  2/1990
JP  2005-096963  4/2005

* cited by examiner

*Primary Examiner* — Amy Cohen Johnson
(74) *Attorney, Agent, or Firm* — K&L Gates LLP

(57) ABSTRACT

An image forming apparatus that can accurately detect whether any one or multiple of a thermochromic member, an optical sensor, and a cooling fan are operating normally or abnormally, and accordingly can run the cooling fan without any failure. The image forming apparatus includes: first and second controlling unit; a thermochromic member that changes color according to the temperature of the first controlling unit; an optical sensor that optically detects a change in the color of the thermochromic member; and a failure detecting unit that is included in the second controlling unit and detects a failure occurring in the thermochromic member and/or the optical sensor based on whether a utilization of the first controller is high or low and a signal from the optical sensor.

9 Claims, 3 Drawing Sheets

IMAGE FORMING APPARATUS

INCORPORATION BY REFERENCE

This application is based upon and claims the benefit of priority from the corresponding Japanese Patent Application No. 2008-034090 filed on Feb. 15, 2008, the entire contents of which is incorporated herein by reference.

FIELD OF THE INVENTION

The present invention relates to image forming apparatuses.

BACKGROUND

The present invention relates to image forming apparatuses having a unit that can detect when a device that monitors the temperature of a central processing unit (CPU), a regulator, or the like that emits heat or when a cooling fan that cools the CPU or the like fails.

The amount of heat a control unit, such as a CPU that controls an image forming apparatus, or a regulator emits increases as a utilization of the control unit increases, such as when performing multiple processes at the same time. Therefore, the cooling fan is generally provided for the apparatus, or a heat sink is generally attached to the CPU in order to cool the CPU.

Additionally, as the temperature of a heat roller in a fixing device increases, the surrounding temperature also increases. Therefore, a cooling fan is generally provided to reduce the temperature.

To reduce power consumption, the fan is only used when the utilization of the CPU becomes greater during a printing operation of the image forming apparatus. The fan is not used when the device is in a power saving mode, such as in a sleep mode. The same applies to cooling due to the heat roller.

However, with the foregoing method of uniformly switching on the cooling fan in the printing mode and off in the power saving mode, the cooling fan is not necessarily switched on or off based on the actual temperature of the CPU.

Therefore, the cooling fan is running even when the temperature of the CPU, or the like, has not greatly increased, such as when a printing operation is just or only recently started. Thus, the power consumption may increase even more.

In order to avoid unnecessary power consumption, it is preferable to detect the actual temperature of the CPU, the regulator, the heat roller in the fixing device, or the like and to run the cooling fan based on the detected temperature.

Therefore a thermochromic member that changes color according to temperature can be attached to or near a CPU, a regulator, a heat roller, or the like. An optical sensor, such as a charge-coupled device (CCD) camera, is used to detect a change in the color of the thermochromic member, and a cooling fan runs based on the signal detected by the optical sensor.

Therefore, the cooling fan will run based on the actual temperature of the CPU, the regulator, the heat roller, or the like. The cooling fan will not unnecessarily run when the temperature is not sufficiently high. Therefore, this technique can reduce power consumption.

However, because this technique uses a thermochromic member and optical sensor, although no issues typically occur as long as these members and/or the cooling fan is operating normally, if a failure occurs in any of these members, the cooling fan cannot run normally.

SUMMARY

The present invention provides a failure detecting unit that accurately detects whether the thermochromic member, optical sensor, and/or cooling fan is operating normally or abnormally. Thus, the present invention provides an image forming apparatus that can run the cooling fan without any failure due to an incorrect detection result obtained by a failure of the detecting unit.

To this end, there is provided an image forming apparatus including: a first controlling unit; a thermochromic member that changes color at a predetermined temperature, the thermochromic member being provided directly on or near the first controlling unit; an optical sensor that detects a change in the color of the thermochromic member; a cooling fan that cools the first controlling unit; and a second controlling unit that includes a fan controlling unit that controls the cooling fan and a failure detecting unit that detects a failure by determining whether a utilization of the first controller is high or low and a signal from the optical sensor.

Accordingly, one can accurately detect whether the thermochromic member, the optical sensor, or the cooling fan is operating normally and therefore, the image forming apparatus which can run the cooling fan without any failure due to an incorrect detection result.

When the cooling fan runs, if the utilization of the first controlling unit is lower than a predetermined utilization, despite the fact that a temperature of a target as measured by the optical sensor is greater than a predetermined temperature and continues longer than a predetermined time, the failure detecting unit may determine that a failure is occurring in the thermochromic member or the optical sensor.

Alternatively, when the cooling fan runs, if the temperature of a target as measured by the optical sensor is greater than a predetermined temperature and the utilization of the first controlling unit is greater than a predetermined utilization and continues longer than a predetermined time, the failure detecting unit may determine that a failure is occurring in the thermochromic member or the optical sensor.

Alternatively, when the cooling fan runs, if the temperature of a target measured by the optical sensor is lower than a predetermined temperature and the utilization of the first controlling unit is greater than a predetermined utilization continues longer than a predetermined time, the failure detecting unit may determine that a failure is occurring in the thermochromic member or the optical sensor.

The first controlling unit, in the image forming apparatus, may be a controller that controls a fixing heater or a controller that controls a regulator. Alternatively, there may be three or more controllers.

Accordingly, whether the thermochromic member, the optical sensor, or the cooling fan is operating normally or abnormally can be accurately detected, and accordingly, the image forming apparatus which can run the cooling fan without any failure due to an incorrect detection result.

Additional features and advantages are described herein, and will be apparent from the following Detailed Description and the figures.

DETAILED DESCRIPTION

An embodiment of the present invention will be described with reference to the accompanying drawings to help understand the present invention.

Figure 1:
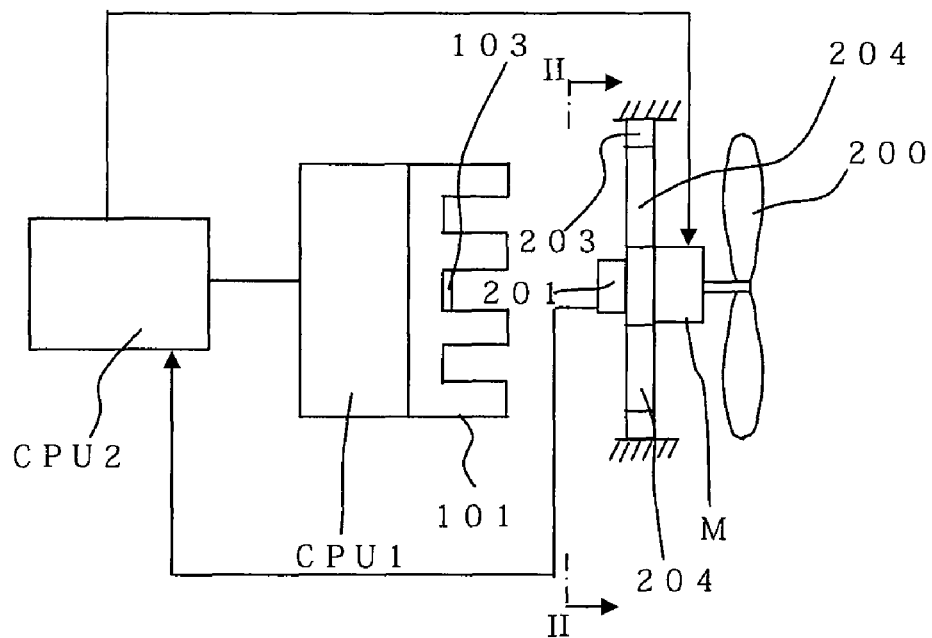
FIG. 1 is a block diagram illustrating a cooling-fan controller of an image forming apparatus according to an embodiment of the present invention.
Figure 2:
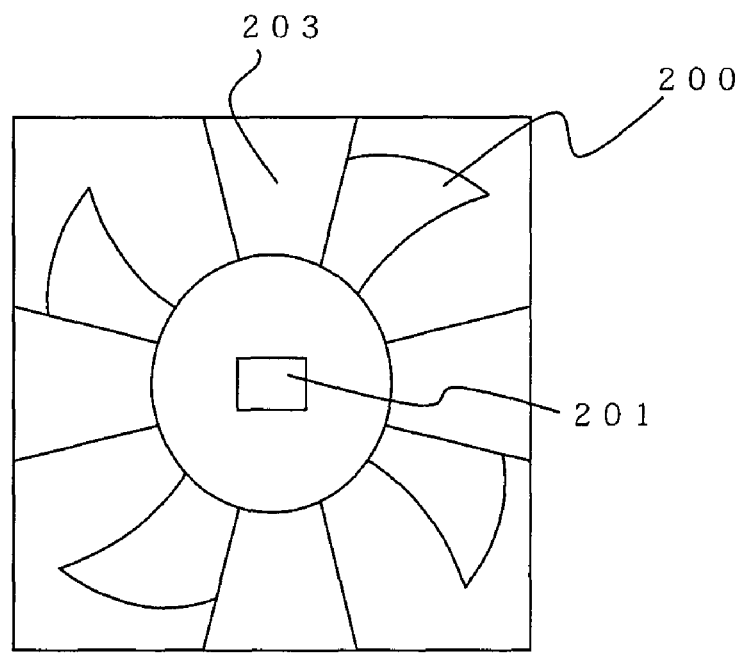
FIG. 2 is a front view of a cooling fan, which illustrates how the cooling fan and an optical sensor are attached to each other.
Figure 3:
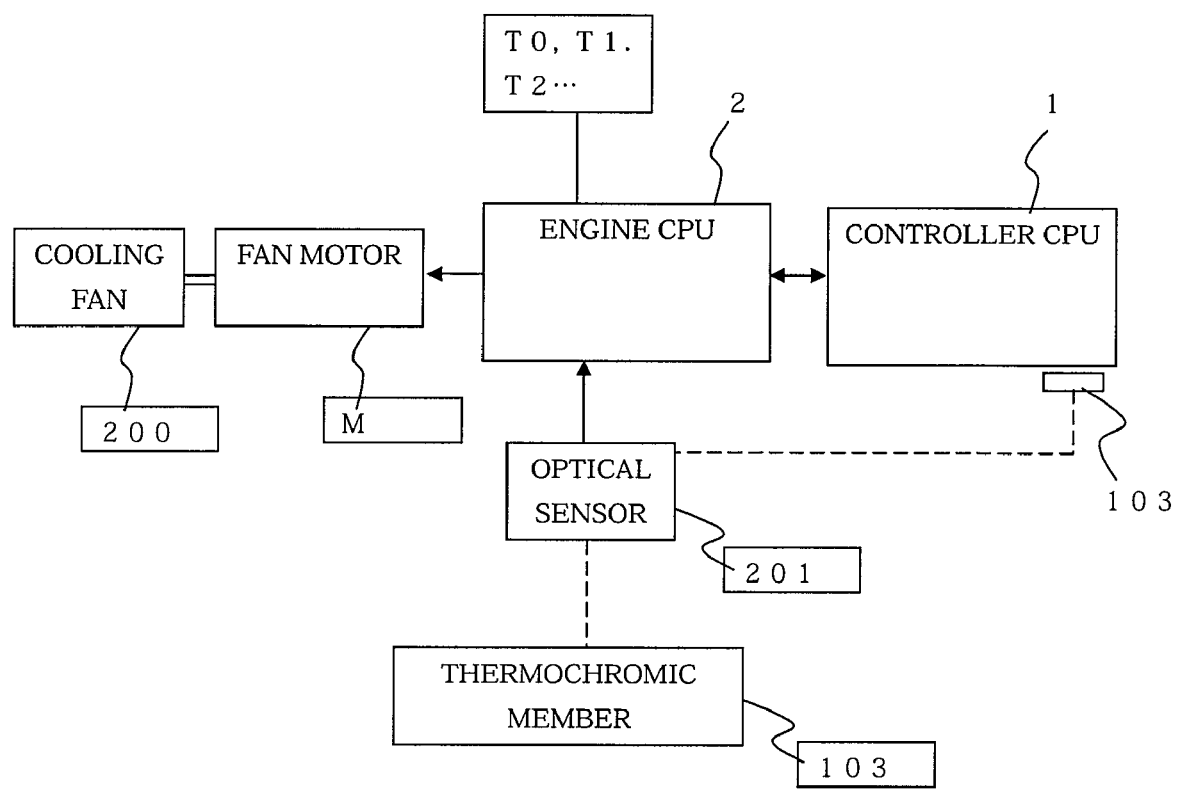
FIG. 3 is a control block diagram of the image forming apparatus according to an embodiment of the present invention.

Referring to FIGS. 1 to 3, an image forming apparatus according to an embodiment of the present invention will now be described.

In this embodiment, the case includes a cooling fan 200 that is used to prevent excessive heat build-up in a controller CPU 1 (an example of a first controlling unit according to the present invention) that controls the entire image forming apparatus except for an image forming process.

As illustrated in FIG. 1, the cooling fan 200 faces the controller CPU 1, which controls the entire image forming apparatus. A motor M that drives the cooling fan 200 is fixed to a support frame 203. Cooling air from the cooling fan 200 is blown through a ventilating opening 204 formed in the support frame 203 to the controller CPU 1 facing the cooling fan 200.

The cooling fan 200 is controlled by an engine CPU 2 that controls an image forming process. The engine CPU 2 is an example of a second controlling unit according to the present invention.

A heat sink 101, including fins for cooling the controller CPU 1, is fixed to the controller CPU 1. Cooling air from the cooling fan 200 is blown through the ventilating opening 204 to the heat sink 101, which in turn efficiently cools the controller CPU 1.

A thermochromic member 103 which changes color at a predetermined temperature, is attached to a part of the heat sink 101. The thermochromic member 103 is attached at a location where heat from the controller CPU 1 is well transmitted and the temperature of the controller CPU 1 is well reflected.

An optical sensor 201, such as a CCD camera, which optically detects the color of the thermochromic member 103 is fixed to a part of the support frame 203 facing the thermochromic member 103 (a central part of the support frame 203 in this embodiment).

The position of the optical sensor 201, the support frame 203, and the cooling fan 200 described above is illustrated in FIG. 2, which is a cross sectional view taken along the line II-II in FIG. 1.

FIG. 3 illustrates a control system including the engine CPU 2, which performs an image forming process, the controller CPU 1, and the cooling-fan driving motor M.

A signal from the optical sensor 201 is inputted to an input section of the engine CPU 2. The engine CPU 2 includes a plurality of timers T1, T2, . . . that function as time measuring units.

The controller CPU 1 is connected to the engine CPU 2. The utilization of the controller CPU 1 can be detected by the engine CPU 2. As has been described above, the thermochromic member 103, which is a target to be measured by the optical sensor 201, is located on or near the controller CPU 1 (on the heat sink 101 in this embodiment). A signal from the optical sensor 201, which detects a change in the color of the thermochromic member 103, is inputted to the engine CPU 2.

The motor M for rotating and driving the cooling fan 200 is connected to an output section of the engine CPU 2.

In this embodiment, as will be described later, the optical sensor 201 detects a change in the color of the thermochromic member 103, which indicates the temperature of the controller CPU 1, or the surrounding temperature, as a change in color. The cooling fan 200 runs based on the signal from the optical sensor 201.

When the thermochromic member 103, the optical sensor 201, or the cooling fan 200 is operating abnormally, the cooling fan 200 cannot be correctly controlled. Therefore, a failure in the thermochromic member 103, the optical sensor 201, or the cooling fan 200 (specifically, a failure in the motor M or a controller therefor) is immediately detected, whereby the controller CPU 1 would not crash.

A failure in the thermochromic member 103, the optical sensor 201, or the cooling fan 200 is determined by using the controller CPU 1 as one index, whereby an accurate determination can be performed. Using the utilization of the controller CPU 1 as an index is premised on the fact that the utilization of the controller CPU 1 is sufficiently reliable in a wide range, and the present invention can be realized within this range.

To this end, in this embodiment, the occurrence of a failure in any one or multiple of the thermochromic member 103, the optical sensor 201, and the cooling fan 200 is detected from a combination of whether the utilization of the CPU 1, which controls such a target to be measured, is high or low and a signal from the optical sensor 201. This process is executed by a failure detecting unit according to the present invention, a specific example of which is described below.

Referring now to the flowchart in FIG. 4, a control process performed by the engine CPU 2 to determine a failure in the thermochromic member 103 or the optical sensor 201 on the basis of the utilization of the controller CPU 1 will be described.

Figure 4:
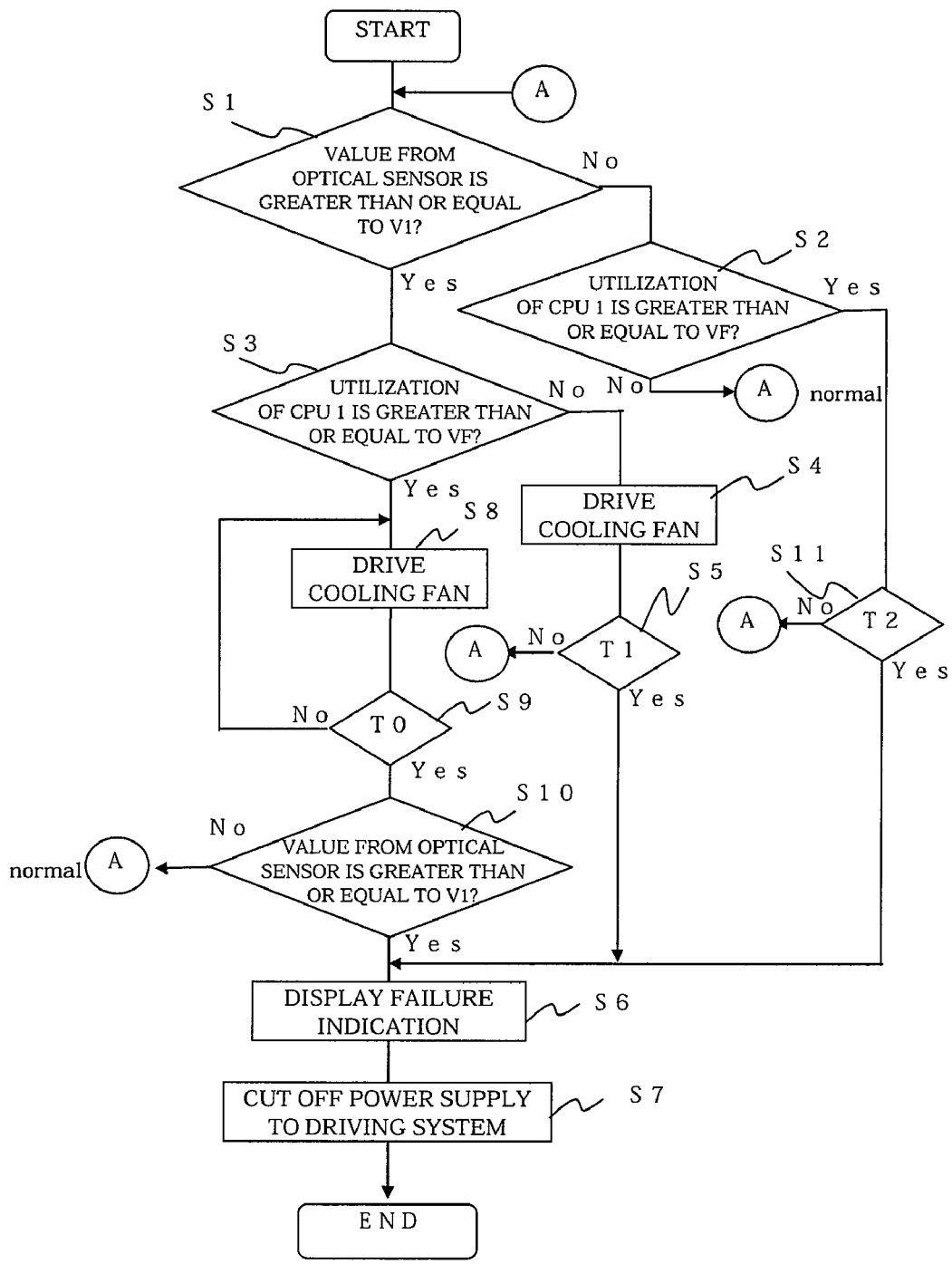
FIG. 4 is a flowchart illustrating a control process performed by the image forming apparatus according to an embodiment of the present invention.

In FIG. 4 and the following description, S1, S2, . . . indicate the numbers of steps performed by the engine CPU 2. In the following description, the engine CPU 2 is simply written as the CPU 2.

In this embodiment, the steps are performed at all times while the image forming apparatus is on.

When the image forming apparatus is turned on, the CPU 2 receives a signal from the optical sensor 201 connected thereto and determines whether the value of the signal from the optical sensor 201 is greater than or equal to a certain value that is determined in advance (which is written as V1 hereinafter) (S1). When the signal value is less than V1 (NO in S1), the CPU 2 measures the utilization of the controller CPU 1 (hereinafter simply written as the CPU 1) (S2). The utilization of a device connected to the CPU 2 can be detected by the CPU 2 using a known method.

When the CPU 2 determines that the measured utilization of the CPU 1 is less than a certain value Vf that is determined in advance (NO in S2), it is determined that the image forming apparatus is in a normal state, such as in a standby state or a power-saving mode. The CPU 2 then brings the process back to S1 and repeats the processing in S1 and S2.

The situation where it is determined YES in S1 or S2 while the processing in S1 and S2 is being repeated will be described below.

For example, when the value of the signal from the optical sensor 201 is greater than or equal to the predetermined value V1 in S1 (YES in S1), the process proceeds to S3. Step S3 is also a step in which it is determined whether the utilization of the CPU 1 is greater than or equal to the predetermined value Vf, as in S2.

When it is determined by the CPU 2 that the utilization of the CPU 1 is less than the predetermined value Vf (NO in S3), it means that the CPU 2 has obtained conflicting information since the utilization of the CPU 1 is actually low, despite the fact that the optical sensor 201 has determined that the temperature of the CPU 1 is high. However, such a situation is temporarily possible immediately after a drop in the utilization of the CPU 1, which had a high temperature due to a greater utilization most recently. Therefore, in such a situation, by cooling the CPU, the optical sensor 201 detects a reduction in the temperature of CPU 1 and normal operation can be restored.

Therefore, the CPU 2 sends to the CPU 1 a signal instructing the CPU 1 to run the cooling fan 200 (S4).

Further in S5, the time from when the cooling fan 200 was started is measured (S5), and, while the time is being measured, the process in steps S1, S3, and S5 is repeated.

The process in steps S1, S3, and S5 is repeated for the predetermined time (T1) set in S5 and if there is no change in state during T1 (if there is no change in determination made in S1 or S3), a conflicting state where the temperature of the CPU 1 is high while the utilization of the CPU 1 is low continues. This despite the fact that the state of the CPU 1 has been stabilized by driving performed by the CPU 1 for the T1 period.

Therefore, the CPU 2 displays a failure indication on a display unit of an operation unit to alert the user (S6). Additionally, the CPU 2 cuts off the power supply to the driving system of the entire image forming apparatus except for circuits in the control system.

The failure indication shows that the output value of the optical sensor 201 is abnormal or the cooling fan 200 (or the motor M therefor) is operating abnormally. There are two causes of an abnormal output value of the optical sensor 201. One is the situation where the optical sensor 201 itself is outputting an abnormal value. The other is the situation where the thermochromic member 103 is operating abnormally. Therefore, this failure indication shows that any one or multiple of the cooling fan 200 (or the motor M therefor), the optical sensor 201 itself, and the thermochromic member 103 are operating abnormally.

When the CPU 2 determines in step S3 that the utilization of the CPU 1 is greater than or equal to the predetermined value Vf, it is conceivable that the optical sensor 201 is detecting a high temperature since the CPU 1 is busy working. This state is normal as the operation of a detecting system. However, when the CPU 1 continuously has a high temperature for a long time, this may cause damage to the CPU 1. Therefore, the CPU 2 runs the cooling fan 200 (S8) to cool the CPU 1.

Step S9 is a time measuring process in which a status quo is maintained until a certain time T0 determined in advance elapses.

In this case, in normal operation, due to the operation of the cooling fan 200, the temperature of the CPU 1 should drop after the predetermined time T0. Therefore, after the predetermined time T0 elapses (YES in S9), information from the optical sensor 201 is detected (S10). When the value of a signal from the optical sensor 201 is less than the predetermined value V1, it is determined that the value of the signal from the optical sensor 201 has dropped due to the cooling effect of the cooling fan 200, that is, the optical sensor 201 and the cooling fan 200 are operating normally. The CPU 2 determines that the state is normal and brings the process back to S1.

In contrast, when the value of the signal from the optical sensor 201 is greater than or equal to the predetermined value V1, despite the cooling process for the predetermined time T0, it is determined that there is a failure in the detecting system including the optical sensor 201 or the cooling fan 200. After displaying a failure indication in S6 as described above, the power supply is cut off in S7.

Since the cause of this failure may be any one or multiple of the cooling fan 200 (or the motor M therefor), the optical sensor 201, and the thermochromic member 103, the failure indication shows that any one or multiple of the above are operating abnormally.

When it is NO in S1, that is, when the CPU 2 determines that the signal from the optical sensor 201 is less than the predetermined value V1, and when the CPU 2 determines in S2 that the utilization of the CPU 1 is greater than or equal to the predetermined value Vf (YES in S2), a conflicting state can occur. However, as an exceptional situation, this state may be transient where the utilization of the CPU 1 is abruptly increased with the start of a fixing process or the like, before which the optical sensor 201 exhibited a low value due to a low utilization of the CPU 1. Therefore, in this situation, in order to exit from the transient state, in S11, as in S5, the CPU 2 enters standby for the predetermined time T2 and repeats the process in S1, S2, and S11.

When the state does not change while the processing in S1, S2, and S11 is being repeated, it means that the conflict is not resolved despite the fact that the transient state has changed during the standby time. Therefore, the CPU 2 determines that a failure has occurred, displays a failure indication in S6, and cuts off the power supply in S7.

Since the cause of this failure may be any one or multiple of the cooling fan 200 (or the motor M therefor), the optical sensor 201 itself, and the thermochromic member 103, the failure indication shows that any one or multiple of the above are operating abnormally.

In the processing in steps S1, S2, and S11, since the optical sensor 201 has not detected a high temperature state of the CPU 1, it is not necessary to run the cooling fan 200. Thus, S4 or S8 in which the cooling fan 200 is run is omitted.

Although the description of the foregoing embodiment concerns the situation where the controller CPU 1 is a target to be measured, the present invention is similarly applicable to a regulator. Also, the present invention is similarly applicable to a controller, such as a CPU that controls a heat roller in a fixing device.

The foregoing embodiment assumes the case where a relatively heavy load is placed on the controller CPU 1, and, depending on the utilization of the controller CPU 1, the temperature of the controller CPU 1 becomes high; and, because the engine CPU 2, which is in charge of an image forming process, bears a relatively light load, the engine CPU 2 is thermally stable and would not crash. In the foregoing situation, the cooling fan 200 is controlled by the stable engine CPU 2 so that the controller CPU 1 would not crash.

However, whether any of the CPUs and controllers is thermally unstable depends on the mechanical design. For example, when the load on the CPU 2, which performs an image forming process, is heavier, the CPU 2 is more likely to crash; and the controller CPU 1, which controls the entire image forming apparatus, is thermally stable because of the safety design.

The present invention is applicable to such various cases.

For example, a cooling fan may be provided facing a CPU that performs an image forming process, and this cooling fan may be controlled by a CPU that controls the entire image forming apparatus.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image forming apparatus, comprising:
   a first controlling unit;
   a thermochromic member that changes color at a predetermined temperature, the thermochromic member being provided directly on or near the first controlling unit;
   an optical sensor that optically detects a change in the color of the thermochromic member;
   a cooling fan that cools the first controlling unit; and
   a second controlling unit that includes a fan controlling unit that controls the cooling fan and a failure detecting unit that detects a failure in at least one of the thermochromic member and the optical sensor based on whether a utilization of the first controlling unit is high or low and a signal from the optical sensor.

2. The image forming apparatus according to claim 1, wherein, when the cooling fan is run, when the utilization of the first controlling unit is lower than a predetermined utilization, despite the fact that a temperature of a target measured by the optical sensor is higher than a predetermined temperature and continues longer than a predetermined time, the failure detecting unit determining that a failure is occurring in the thermochromic member and/or the optical sensor.

3. The image forming apparatus according to claim 1, wherein, when the cooling fan is run, when a temperature of a target measured by the optical sensor is higher than a predetermined temperature and the utilization of the first controlling unit is higher than a predetermined utilization and continues longer than a predetermined time, the failure detecting unit determining that a failure is occurring in the thermochromic member and/or the optical sensor.

4. The image forming apparatus according to claim 1, wherein, when the cooling fan is run, when a temperature of a target measured by the optical sensor is lower than a predetermined temperature and the utilization of the first controlling unit is higher than a predetermined utilization and continues longer than a predetermined time, the failure detecting unit determining that a failure is occurring in the thermochromic member and/or the optical sensor.

5. The image forming apparatus according to claim 1, wherein the first controlling unit is a controlling unit that controls a regulator.

6. An image forming apparatus, comprising:
   a first controlling unit, including a thermochromic member that changes color at a predetermined temperature;
   a sensor that optically detects a change in the color of the thermochromic member;
   a fan that cools the first controlling unit; and
   a second controlling unit that includes a fan controlling unit that controls the cooling fan and a detecting unit that determines if there is a failure in at least one of the thermochromic member and the optical sensor based on a utilization of the first controlling unit and a signal from the sensor.

7. The image forming apparatus according to claim 6, wherein, when the fan is run, when the utilization of the first controlling unit is lower than a predetermined utilization, despite the fact that a temperature of a target measured by the sensor is higher than a predetermined temperature and continues longer than a predetermined time, the detecting unit determining that a failure is occurring in the thermochromic member and/or the sensor.

8. The image forming apparatus according to claim 6, wherein, when the fan is run, when a temperature of a target measured by the sensor is higher than a predetermined temperature and the utilization of the first controlling unit is higher than a predetermined utilization and continues longer than a predetermined time, the detecting unit determining that a failure is occurring in the thermochromic member and/or the sensor.

9. The image forming apparatus according to claim 6, wherein, when the fan is run, when a temperature of a target measured by the sensor is lower than a predetermined temperature and the utilization of the first controlling unit is higher than a predetermined utilization and continues longer than a predetermined time, the failure detecting unit determining that a failure is occurring in the thermochromic member and/or the sensor.

* * * * *